Dec. 1, 1931.   L. H. CHURCH   1,833,988
CABLE CONNECTER
Filed Nov. 12, 1926

INVENTOR
Lewis H. Church
BY
Bohleber & Ledbetter
ATTORNEYS

Patented Dec. 1, 1931

1,833,988

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed November 12, 1926. Serial No. 148,069.

This invention relates to cable connecters and particularly to adapter connecters capable of universally anchoring cable of all sizes and shapes to electric fixture or outlet boxes.

The subject matter of this application has been divided out in part of copending Patent 1,644,308 dated Oct. 4, 1927, application Serial Number 104,129 filed April 23, 1926.

In the copending application there is covered broadly a cable connecter for securing cable to electric fixture boxes, and the connecter is universal in its utility, i. e. it may be used with many or all styles of cable such as flat, oval or round cable, metal armored or fibre armored cable, and hard or soft cable.

That connecter includes box hole anchorage means by which the connecter is anchored in a box and includes an adapter clamp element movably mounted on the connecter member. Operating means such as a screw is carried with the connecter for cooperation with the adapter clamp to move the adapter into place, and to secure and clamp the cable in the connecter.

What is of further importance is that guide means are employed to guide the movement of the adapter clamp element in movable relation in or to the connecter member to maintain said adapter clamp in working alignment with the operating means, and the guide or retaining means for the adapter clamp herein claimed is shown as a modified form of the invention in my former application.

The present invention has for one of its objects the provision of improved means for the retention of the adapter clamp element in operative relation with respect to the screw operating means carried with the connecter. Accordingly, cooperating positioning means are interposed between the connecter member and the adapter clamp element which include a cut away portion and an entering portion. More particularly the connecter member is formed with or carries a projecting element or lug adapted to enter a receiving space or slot formed in a flange carried with the adapter clamp means. Preferably the flange serves as a closure or shutter for that portion of the cable passage in the connecter not occupied by the cable.

The invention also seeks to facilitate the insertion and removal of a connecter member within the hole in an electric fixture box. To this end a connecter member includes weakening means, i. e. instrumentalities by which a connecter has its rigidity broken or relieved to permit contraction so that the connecter may be more easily inserted or snapped into a box hole. Preferably a connecter of the longitudinally split sleeve type is formed with a circumferentially extending slot intersecting the longitudinal split and proximate the box hole anchorage portion so that only that end of the connecter which engages the box hole edge need be contracted to snap the connecter into place.

These and other objects of the invention and the means for their attainment will be more apparent from the following description taken in connection with the accompanying drawings illustrating a preferred embodiment thereof and in which:

The first three views show the make-up of one part of the device, namely, the connecter member or sleeve.

The next three views show the adapter element and its construction.

Figure 4:
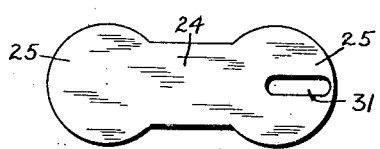

Figure 4 is a view showing a flat stamping from which the adapter including cable clamp plate and shutter means is made.

Figure 5:
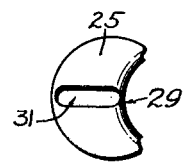
Figure 6:
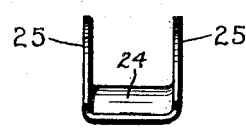

Figures 5 and 6 show end and side elevations of the completed adapter element.

The next three views show the assembly of the connecter member and adapter element.

Figure 7:
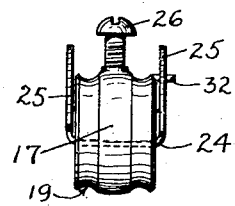
Figure 8:
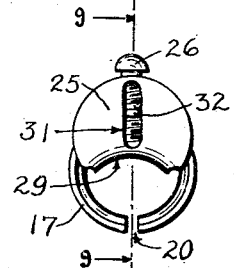

Figure 7 is a side elevation, and Figure 8 is an end elevation, showing the complete cable connecter assembly.

Figure 9:
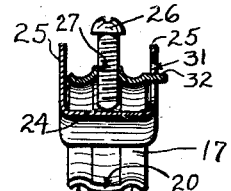

Figure 9 is a longitudinal vertical sectional view of the complete cable connecter taken in the plane indicated by the line 9—9 in Figure 8.

Figure 10:
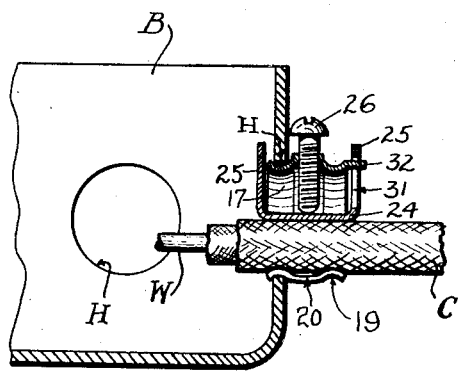

Figure 10 is a view in longitudinal vertical section showing the cable connecter mounted in an electric fixture box with a cable secured therein.

Figure 11:
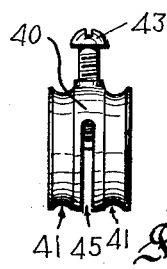

Figure 11 is a view, in side elevation, showing a modified cable connecter provided with weakening means whereby its rigidity is relieved to permit contraction so that it may more easily be inserted in a fixture box hole.

Figure 12:
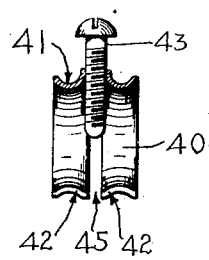

Figure 12 is a longitudinal vertical sectional view of the connecter according to Figure 11.

Electric fixture boxes B are manufactured with knock-out openings or holes H to receive the cable C and connecters and by the use of my improved connecter the cable is anchored in the box B and electrical wiring connections are made inside the box with the wires W coming from the cable.

The cable connecter covered in the co-pending application secures cable of various sizes and shapes in standard electric fixture boxes and closes that portion of the box hole or knock-out not occupied by the cable against the admission of dirt or other foreign matter, and in case of a sleeve-type connecter being employed, the sleeve space above or adjacent the cable is also closed.

Figure 1:
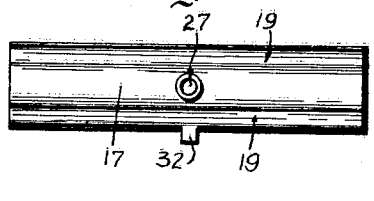
Figure 1 is a view showing a flat grooved stamping before being rolled into sleeve form to make a connecter member, having a threaded hole for the reception of screw operating means and an extended portion or lug forming one of the cooperating guide means to engage a cable clamping member.
Figure 2:
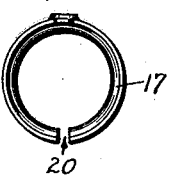
Figure 2 is an end elevation.
Figure 3:
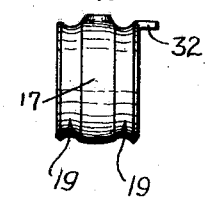
Figure 3 is a side elevation, showing the completed connecter member.

The cable connecter of the present invention as well as that of my former application may comprise a connecter member 17, usually a sleeve, formed of a resilient metal plate or stamping shown in Figure 1 which is rolled into cylindrical shape, with box hole anchorage grooves 19 proximate the ends. The ends of the Figure 1 stamping come together to form a longitudinal split 20 which permits the connecter member to be contracted, that is, its circumference is reduced for insertion within the box hole H. The box hole edge H is engaged, upon expansion of the connecter member 17 within one of the grooves 19 as shown, to effect anchorage of the connecter member 17 in a box hole. While a sleeve type part 17 is shown other forms of construction may be used.

The connecter member 17 is thus adapted to receive a cable C. Within or upon the connecter is mounted an adapter element comprising cable clamp plate 24 formed from a plate or stamping as shown in Figure 4 whereof the respective ends 25 may be circular to form shutters 25 at one or both ends of the sleeve. These shutter ends 25 are bent upwardly to serve as positioning or guiding means as well as shutters whereby the adapter element 24—25 may be moved laterally or radially in respect to the connecter axis and in respect to the axis of cable C and in respect to screw operating means 26 which is threaded through a screw hole 27 formed in the connecter member 17 to drive the adapter bearing plate 24 against the cable C and clamp it in the connecter and anchor the connecter in the box hole H.

Preferably the bearing clamp plate 24 may be given, between the shutters 25, a curvilinear or cylindrical form as shown at 29, whereby it conforms generally to the shape of a cable C. The shutters 25 are of such dimension as to close the respective ends of the sleeve 17, or that portion thereof not occupied by the cable C to close the box hole H to prevent the admission of dirt or plaster into the interior of the electric fixture box B and thus form what may be referred to as the shutters or closure ends. The ends 25 also serve as positioning means for the adapter to prevent axial displacement and as guiding means for the adapter as it is moved toward or away from the cable C by the operating or clamping screw 26.

According to the aspect of the invention forming the subject matter of this divisional application, an improvement is presented to retain the cable clamp plate 24 of the adapter element in alignment with the operating means and to prevent rotation of the adapter 24—25 in the sleeve 17 and about the axis of the cable C. Cooperating means is provided between the clamp plate 24 and the connecter member 17 to position or guide the clamp plate 24 in operative relation with the end of the screw 26. Preferably the upstanding portion 25 is cut away as at 31 to receive a projection 32 carried with the cylindrical connecter member 17. In the illustrated embodiment, the projection takes the form of a lug 32 integral with the connecter member 17 and in the same longitudinal vertical plane that includes the screw 26 while the cut out portion takes the form of a slot 31 to receive the lug 32 and disposed normally in the aforementioned vertical plane.

It will thus be seen that guide means are provided between the adapter 24—25 and the connecter member 17 whereby the adapter is guided in its reciprocation radially of the connecter 17 and retained always in working relation with respect to the operating means 26, so that the clamp plate 24 moves freely in the sleeve or any other type connecter part 17 and thus the standard size box hole H may have secured therein any size cable C. In this way I provide improved guide means entirely independent of the clamp operating means by which the movable parts of the connecter are maintained in alignment.

Figures 11 and 12 illustrate a modification of a cable connecter in which the connecter member 40 is of sleeve form, and is provided with box hole anchorage means, i. e. the grooves 41 are adapted to engage the edges of a hole H in an electric fixture box B. The sleeve is split longitudinally at 42 to permit contraction for insertion in the box hole H. Preferably opposite the split 42 the sleeve is tapped to receive a screw 43 adapted to be advanced radially to engage a cable C and clamp the same between itself and the interior surface of the sleeve.

Weakening means are provided with this cable connecter, i. e. instrumentalities by which the connecter has its rigidity relieved to permit its contraction, so that the connecter may be more easily inserted or snapped into a box hole. To this end the illustrated embodiment shows the sleeve connecter 40 formed, between the grooves 41 with a circumferentially extending slot 45 which preferably intersects the split 42 and thus partially divides the connecter into two spaced end portions, only one of which need be contracted for insertion in the box hole H, thus rendering it easier to do so, and enable the manufacturer to use heavier stock from which to make the connecter.

It is to be understood that while the connecter member 40 is not illustrated as provided with a cable clamp plate or shutters or guide means therefor, it is applicable for use in connection therewith.

Various modifications may be made in the connecter or connecters without departing from the scope of the principle of the invention.

What I claim is:

1. A connecter comprising, a sleeve split longitudinally and also formed with a peripheral groove for anchorage within a box hole, said sleeve being formed with a circumferentially extending slot to break the rigidity of the sleeve, and cable clamping means carried with the connecter.

2. A cable connecter comprising, a member split longitudinally and formed with a peripheral groove for anchorage within a box hole, said member being formed with a circumferentially extending slot proximate the groove to relieve it of rigidity to facilitate snapping the groove into a box hole, and cable clamping means.

3. A connecter comprising, a sleeve split longitudinally and formed with box hole edge anchorage grooves proximate its ends, and a circumferentially extending slot between the grooves, and cable clamping means carried with the connecter.

4. A connecter comprising a longitudinally split sleeve having resilient box hole anchorage means and cable clamping means, and said sleeve being formed with a circumferentially extending slot to increase the flexibility of the anchorage means to facilitate snapping the connecter into a box hole.

5. A connecter comprising, a longitudinally split sleeve formed with box hole anchorage grooves proximate its ends and a circumferentially extending slot between the grooves, said slot and split bisecting one another, and cable clamping means carried with the connecter.

6. A cable connecter comprising a sleeve formed with similar anchorage grooves proximate its ends said sleeve being longitudinally split for permitting contraction thereof and having a medial portion separating said grooves, said medial portion having a circumferentially extending slot therein whereby either end of said sleeve may be contracted independent of the other end thereby requiring only a portion of said sleeve to be contracted upon inserting the same into a box hole and enabling either end to be inserted in said hole with equal facility.

7. A cable connecter comprising a sleeve formed with similar anchorage grooves proximate its ends said sleeve being longitudinally split for permitting contraction thereof and having a medial portion separating said grooves, said medial portion having a circumferentially extending slot therein whereby either end of said sleeve may be contracted independently of the other end thereby requiring only a portion of said sleeve to be contracted upon inserting the same into a box hole and enabling either end to be inserted in said hole with equal facility, and clamping means in said medial portion opposed to said slot whereby cable may be clamped against the slotted side of the sleeve with the full resistance of the entire length of the sleeve.

In testimony whereof I affix my signature.

LEWIS H. CHURCH.